(12) United States Patent
Ito

(10) Patent No.: US 8,248,703 B2
(45) Date of Patent: Aug. 21, 2012

(54) ZOOM LENS AND OPTICAL APPARATUS HAVING THE ZOOM LENS

(75) Inventor: Rei Ito, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 37 days.

(21) Appl. No.: 12/987,752

(22) Filed: Jan. 10, 2011

(65) Prior Publication Data

US 2011/0176222 A1    Jul. 21, 2011

(30) Foreign Application Priority Data

Jan. 16, 2010    (JP) .................................. 2010-007579

(51) Int. Cl.
*G02B 15/14* (2006.01)
(52) U.S. Cl. .......................... 359/682; 359/676; 359/689
(58) Field of Classification Search ................. 359/676, 359/680–682, 689
See application file for complete search history.

(56) References Cited

U.S. PATENT DOCUMENTS

| 6,396,642 B2 * | 5/2002 | Takatsuki ...................... 359/680 |
| 6,646,815 B2 | 11/2003 | Nobe |
| 7,474,472 B2 | 1/2009 | Hozumi et al. |

* cited by examiner

*Primary Examiner* — James Greece
(74) *Attorney, Agent, or Firm* — Canon U.S.A., Inc. IP Division

(57) ABSTRACT

A zoom lens includes a first lens unit having a negative refractive power, a second lens unit having a positive refractive power, and a third lens unit having a positive refractive power. Each lens unit moves during zooming. The first lens unit consists of two lenses, the second lens unit consists of, in order from the object side to the image side, a positive lens, a positive lens, a negative lens, and a positive lens, and the third lens unit consists of one lens. A focal length of the entire zoom lens at a wide-angle end (fw), a focal length of the first lens unit (f1), a focal length of the second lens unit (f2), a focal length of the positive lens included in the second lens unit (fG24), and amounts of movement (m2, m3) of the second lens unit and the third lens unit during zooming are appropriately set.

10 Claims, 13 Drawing Sheets

WIDE-ANGLE

MIDDLE

FOCUSING

TELEPHOTO

WIDE-ANGLE

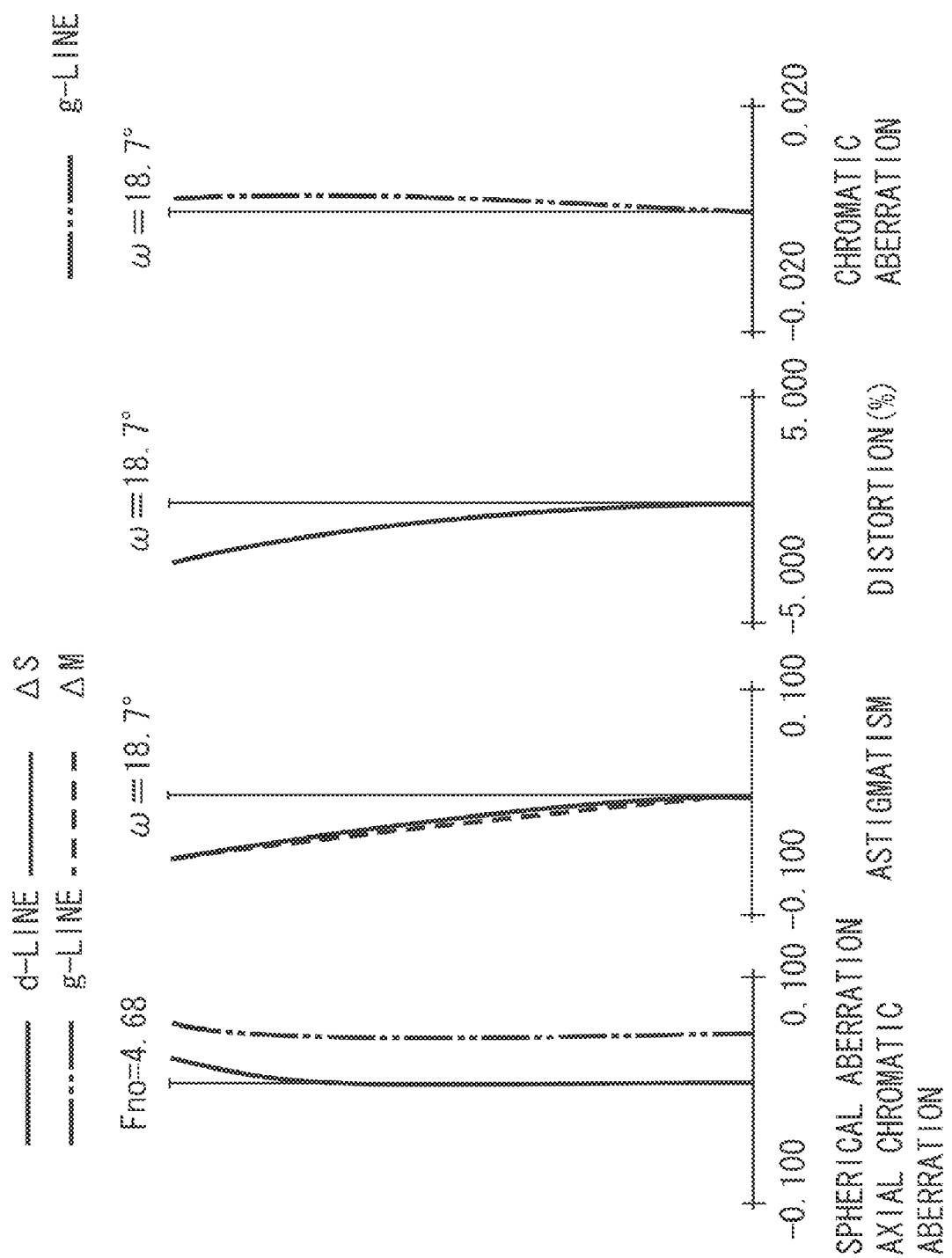

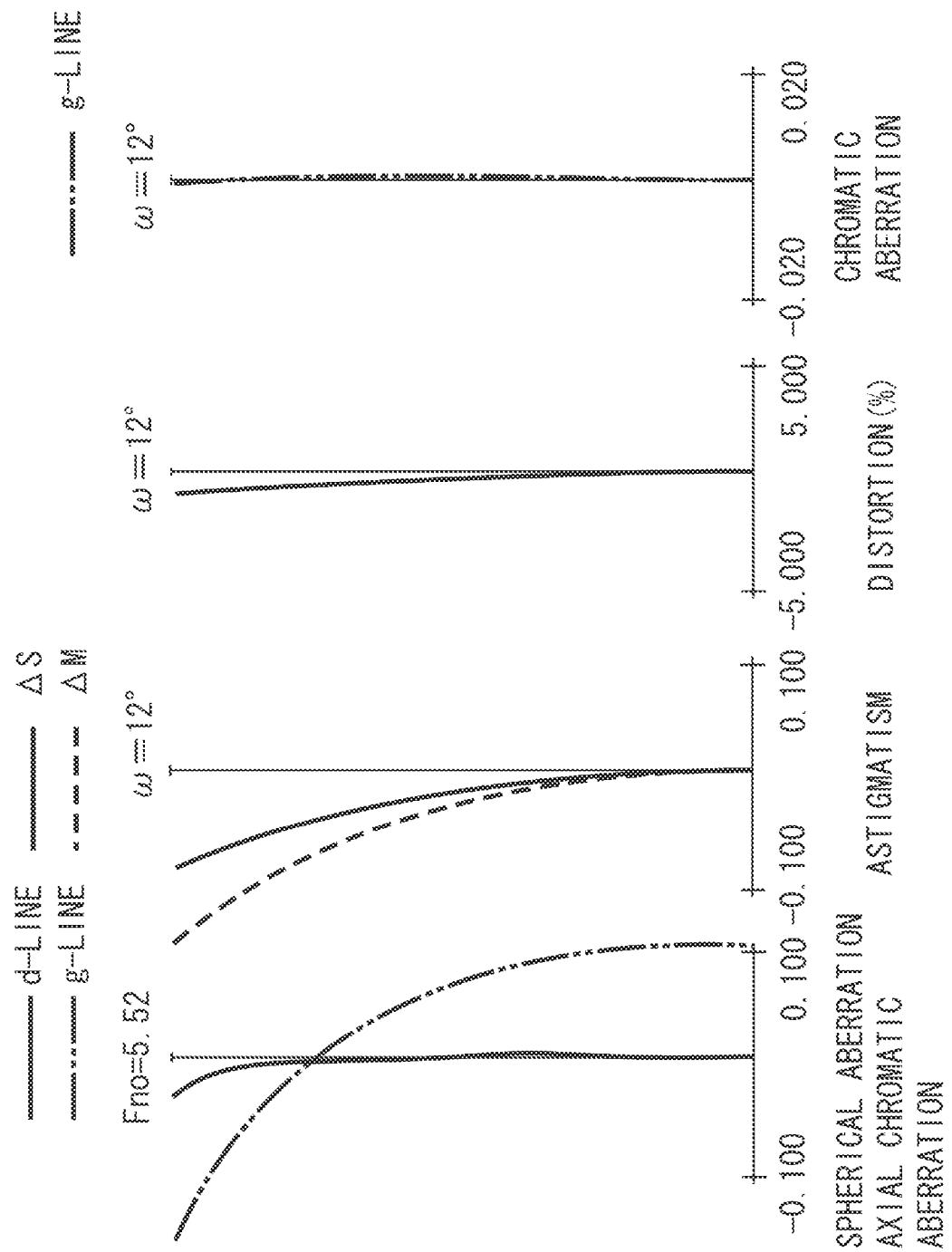

WIDE-ANGLE

MIDDLE

TELEPHOTO

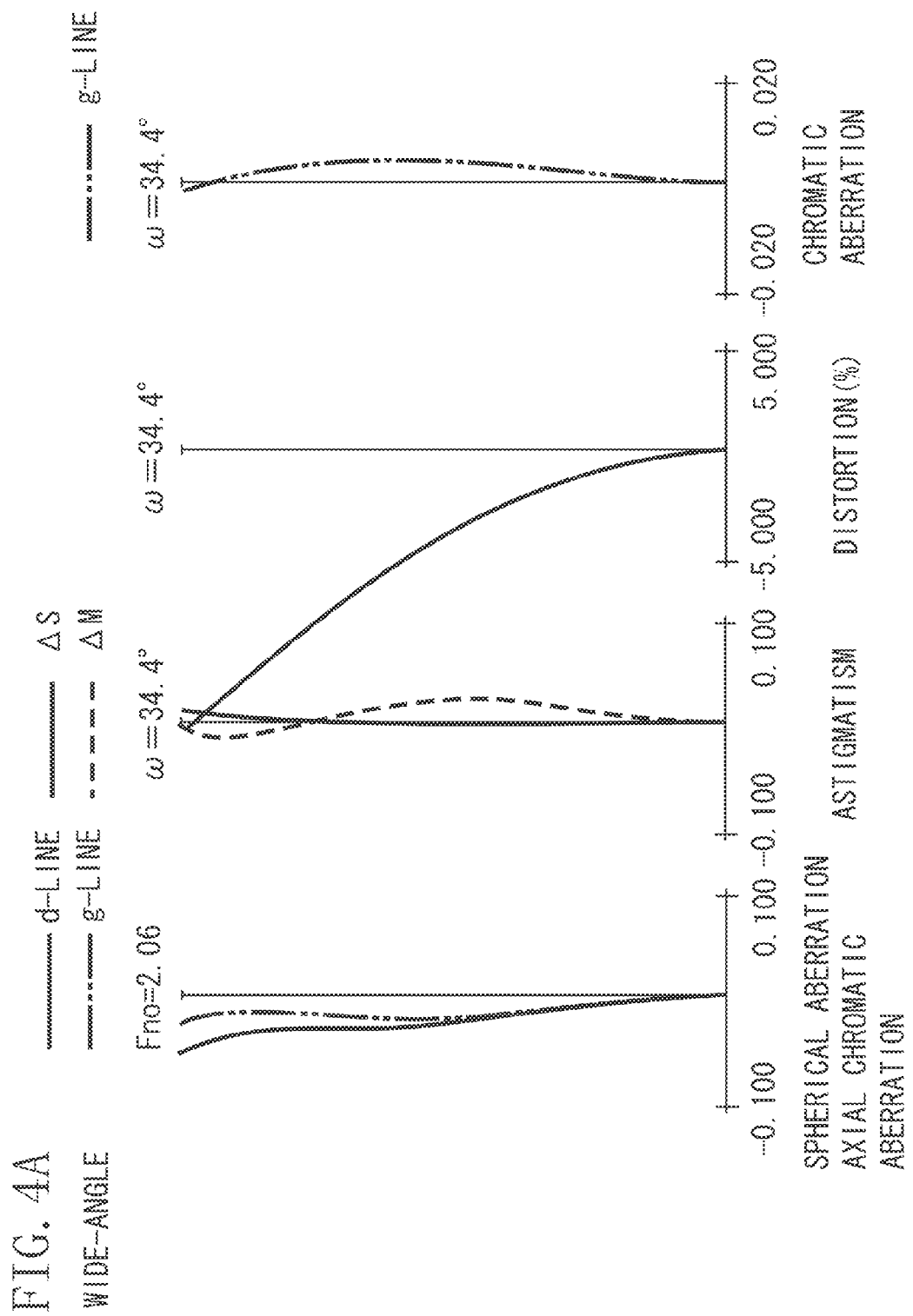

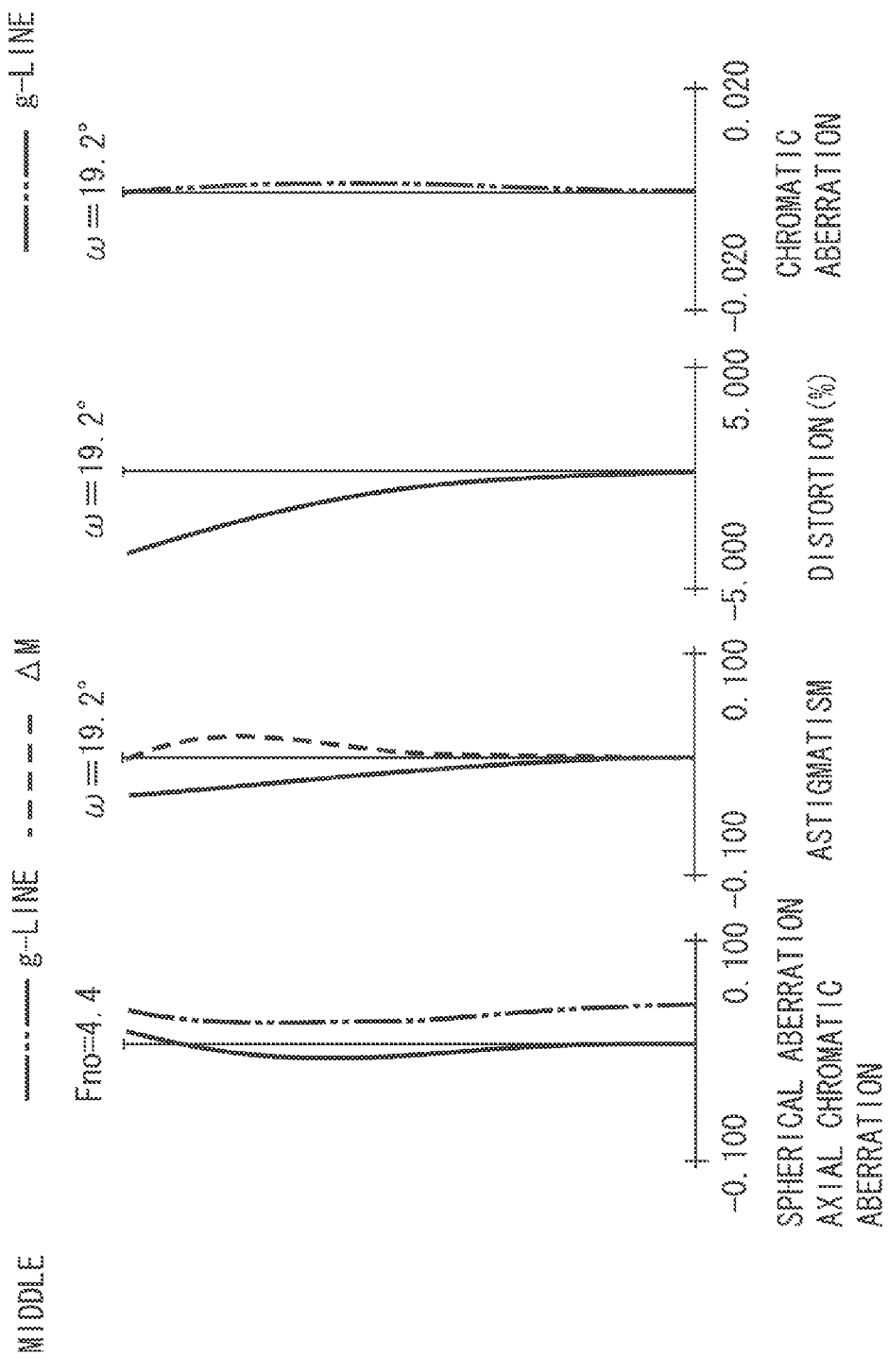
FIG. 4B MIDDLE

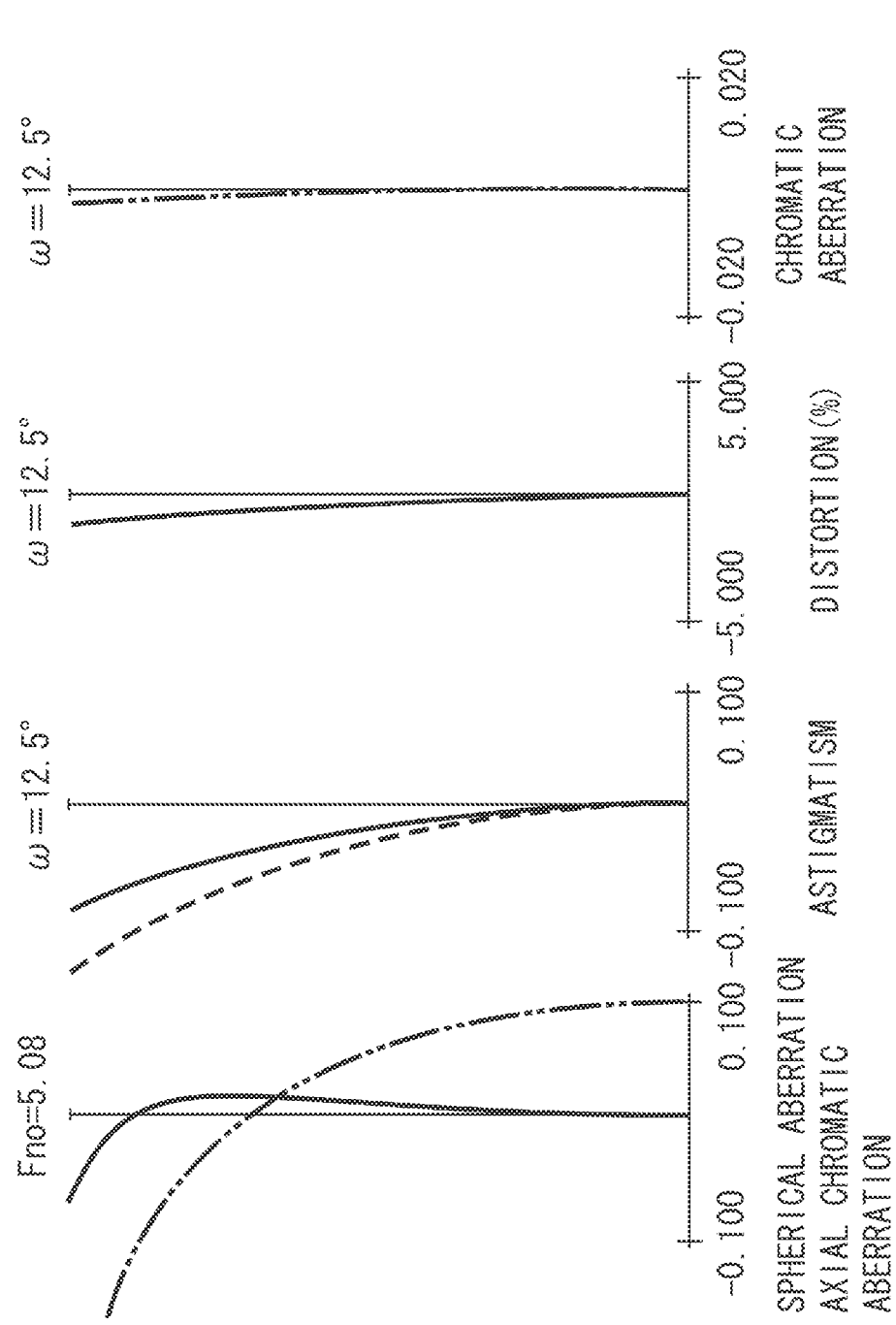

WIDE-ANGLE

MIDDLE

TELEPHOTO

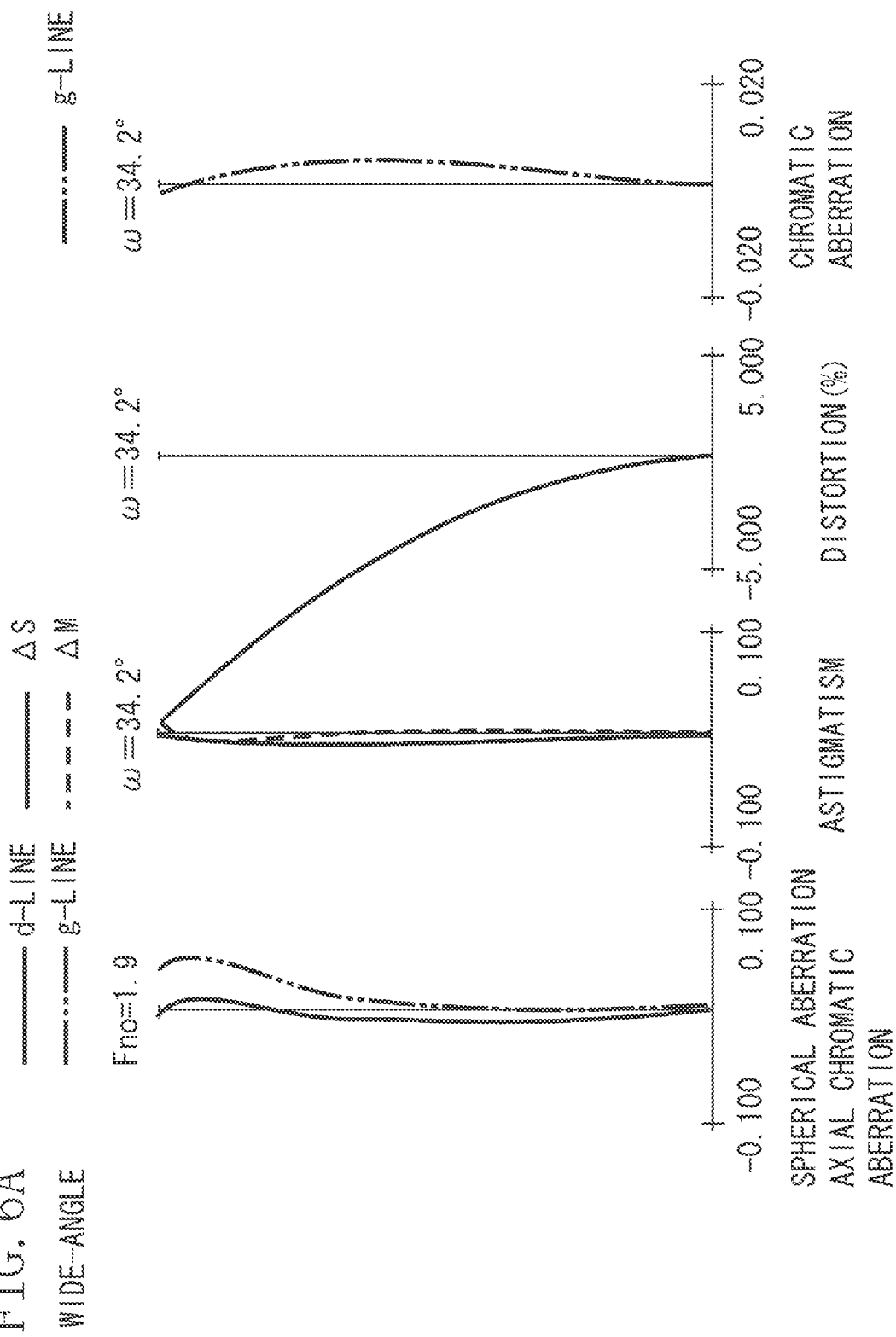

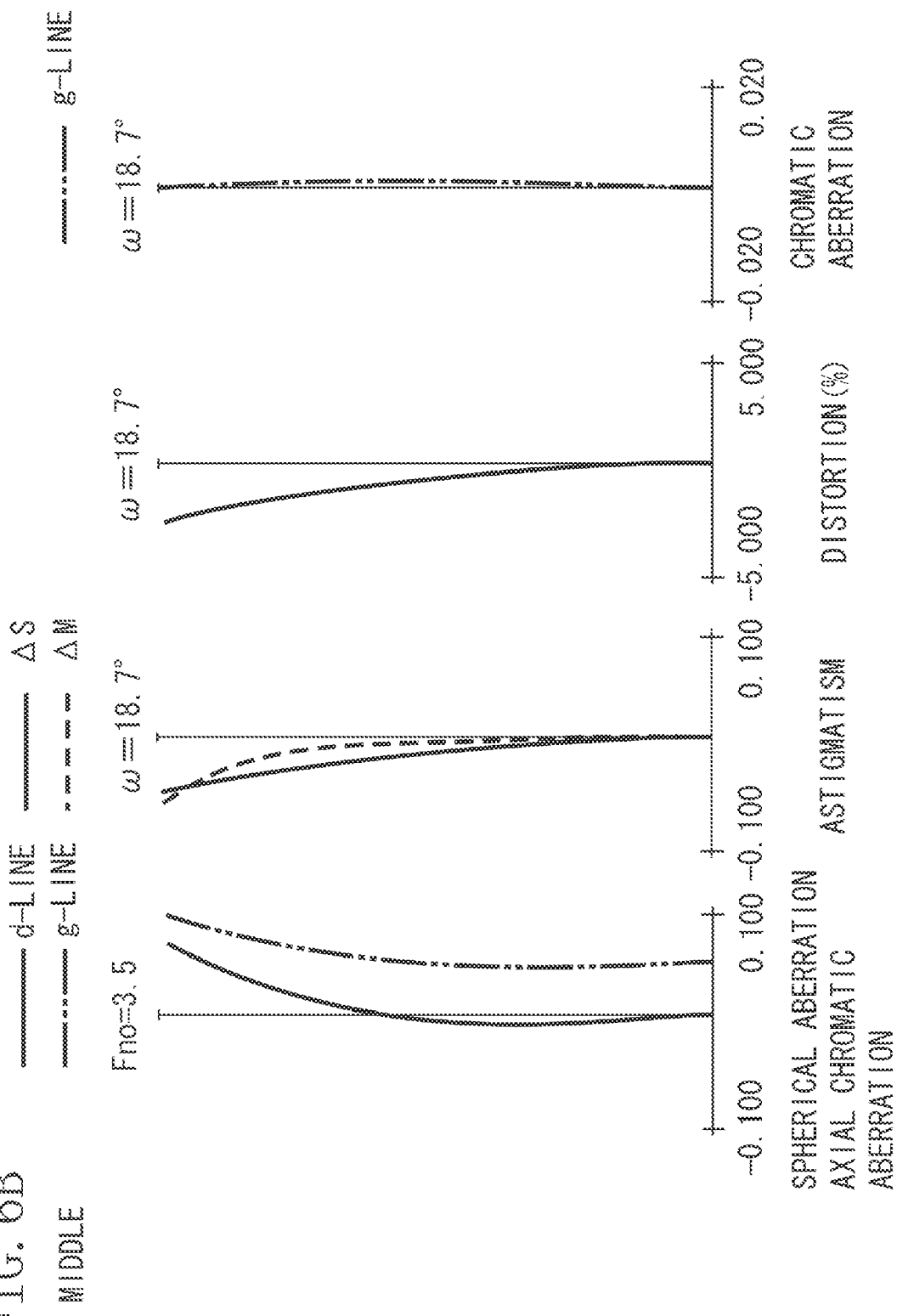

TELEPHOTO

ZOOM LENS AND OPTICAL APPARATUS HAVING THE ZOOM LENS

BACKGROUND OF THE INVENTION

1. Field of the Invention

The present invention relates to a zoom lens. More specifically, the present invention relates to a zoom lens useful as a photographic optical system for an optical apparatus, such as a digital still camera, a video camera, a TV camera, or a monitoring camera.

2. Description of the Related Art

In recent years, the functions of an optical apparatus (image pickup apparatus (camera)) that uses a solid-state image sensor, such as a video camera or a digital still camera, have increased substantially. At the same time, market forces demand that newly designed image pickup apparatuses be small and highly efficient. To that end, an optical system used in an optical apparatus like a camera is designed with a small-size zoom lens having a wide angle of view (photographic angle of view), a high aperture ratio, and a high optical performance.

A camera of this type includes various optical members, such as a low-pass filter and a color correction filter, which are disposed between a rearmost lens and an image sensor. Accordingly, it is desirable that a zoom lens used as an optical system of the camera described above has a relatively long back focal length. In addition, for a color camera that uses an image sensor for capturing a color image, it is desirable that the optical system of the camera has a high telecentricity on the image side in order to prevent shading of color.

As a zoom lens (optical system) whose entire size is small and which has a long back focus and a high telecentricity on the image side, a negative lead type zoom lens is conventionally used. In the negative lead type zoom lens, a lens unit having a negative refractive power is located at a position closest to the object side.

U.S. Pat. No. 6,646,815 (Patent '815) discusses an example of a negative lead type zoom lens. Patent '815 discloses a three-unit zoom lens including, in order from the object side to the image side, a first lens unit having a negative refractive power, a second lens unit having a positive refractive power, and a third lens unit having a positive refractive power, and having a high telecentricity on the image side. Similarly, U.S. Pat. No. 7,474,472 (Patent '472) discusses a three-unit zoom lens of this zooming type having a high telecentricity on the image side and a high aperture ratio.

In a negative lead type zoom lens including three or more lens units, in order to achieve a wide angle of view and a high zoom ratio while reducing the size of the entire optical system, it is useful to increase the refractive power of each lens unit. However, if the refractive power of each lens unit is merely increased to achieve a wide angle of view and a high zoom ratio, the amount of aberrations occurring during zooming may greatly vary. Accordingly, in this case, it may become difficult to achieve a high optical performance for the entire zoom range.

Furthermore, if the aperture ratio is increased at the wide-angle end in this case, it becomes difficult to correct various aberrations including spherical aberration and coma in particular. In order to effectively correct various aberrations in this case, it is necessary to increase the number of lenses included in each lens unit. However, if the number of lenses is merely increased, the lens total length may increase. Accordingly, in this case, it becomes difficult to reduce the total size of the optical system.

In a negative lead type zoom lens including three or more lens units, in order to achieve a wide angle of view, a high zoom ratio, and a wide aperture ratio while reducing the size of the entire optical system, it is significant to satisfy at least one of the following conditions. Firstly, it is necessary to appropriately set the refractive power of the first lens unit in relation to the refractive power of the entire optical system. If the refractive power of the first lens unit is not appropriately set in relation to the refractive power of the entire optical system, the effective diameter of the front lens becomes very large. In this case, the size of the entire optical system cannot be easily reduced.

Secondly, it is necessary to appropriately set the arrangement of the refractive power of each lens included in each lens unit located around the aperture stop. If the arrangement of the refractive power of each lens included in each lens unit located around the aperture stop is not appropriately set, it becomes difficult to effectively correct spherical aberration and coma at the wide-angle end.

Thirdly, it is necessary to appropriately set a condition for moving a second lens unit and a third lens unit during zooming. If a condition for moving a second lens unit and a third lens unit during zooming is not appropriately set, it becomes difficult to effectively correct spherical aberration and coma at the wide-angle end.

SUMMARY OF THE INVENTION

The present invention is directed to a zoom lens whose size of the entire optical system is small, having a wide angle of view, a high zoom ratio, and a high aperture ratio, and having a high optical performance for the entire zoom area, and is also directed to an optical apparatus having the zoom lens.

According to an aspect of the present invention, a zoom lens includes, in order from an object side to an image side and arranged along an optical axis thereof, a first lens unit having a negative refractive power, a second lens unit having a positive refractive power, and a third lens unit having a positive refractive power. In the zoom lens, each lens unit moves during zooming from a wide-angle end to a telephoto end, the first lens unit consists of two lenses, the second lens unit consists of, in order from the object side to the image side, a positive lens, a positive lens, a negative lens, and a positive lens, and the third lens unit consists of one lens. In the zoom lens, a focal length of the entire zoom lens at the wide-angle end (fw), a focal length of the first lens unit (f1), a focal length of the second lens unit (f2), a focal length of the positive lens included in the second lens unit and located closest to the image side (fG24), and amounts of movement of the second lens unit (m2) and movement of the third lens unit (m3) in a direction of the optical axis during zooming from the wide-angle end to the telephoto end (a sign of the amount of movement is positive during moving towards the image side) satisfy the following conditions:

$$1.3 < |f1/fw| < 2.3$$

$$1.0 < fG24/f2 < 1.6$$

$$-0.15 < m3/m2 < -0.01.$$

Further features and aspects of the present invention will become apparent to persons having ordinary skill in the art from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIGS. 2A, 2B, and 2C are aberration charts of the zoom lens according to the first exemplary embodiment at the wide-angle end, at the middle focal length, and at the telephoto end, respectively.

FIGS. 4A, 4B, and 4C are aberration charts of the zoom lens according to the second exemplary embodiment at the wide-angle end, at the middle focal length, and at the telephoto end, respectively.

FIGS. 6A, 6B, and 6C are aberration charts of the zoom lens according to the third exemplary embodiment at the wide-angle end, at the middle focal length, and at the telephoto end, respectively.

DESCRIPTION OF THE EMBODIMENTS

Figure 1A:
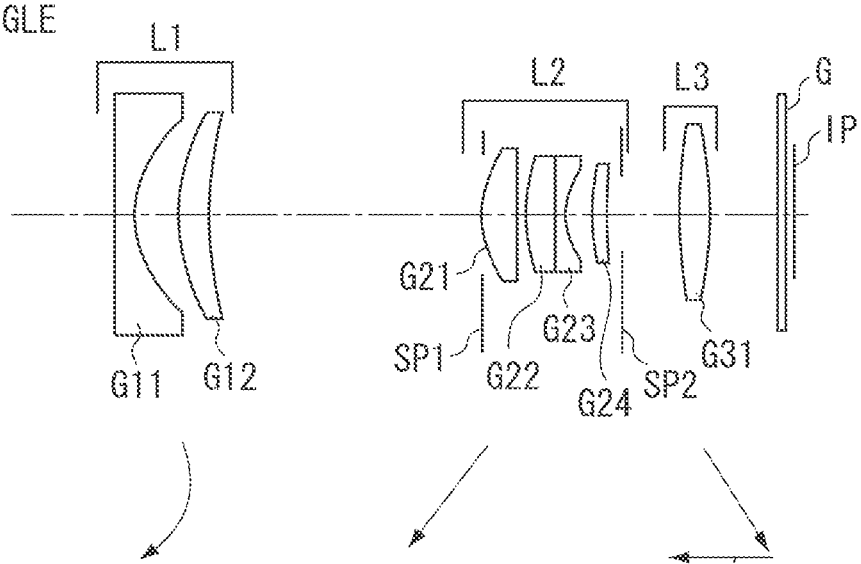
FIGS. 1A, 1B, and 1C are lens cross sections of a zoom lens according to a first exemplary embodiment of the present invention at the wide-angle end, at a middle focal length, and at the telephoto end, respectively.

Various exemplary embodiments of the present invention will now be described in detail with reference to the drawings. It should be noted that the relative arrangement of the components, the numerical expressions, and numerical values set forth in these embodiments do not limit the scope of the present invention unless it is specifically stated otherwise.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example the zoom ratio and F-number, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed in subsequent figures.

Note that herein when referring to correcting or corrections of an error (e.g., aberration), a reduction of the error and/or a correction of the error is intended. In addition, as used herein, the side of a lens where an object to be imaged is located is referred to as the object side or front side of the lens; and the side of the lens where the image of the object is formed is referred to as the image side or back side of the lens.

A zoom lens according to an exemplary embodiment of the present invention includes, in order from the object side to the image side, a first lens unit having a negative refractive power, a second lens unit having a positive refractive power, and a third lens unit having a positive refractive power. Each such lens unit moves during zooming. In the zoom lens according to an exemplary embodiment of the present invention, a lens unit having a refractive power can be located at a position on the object side of the first lens unit or at a position on the image side of the third lens unit.

Figure 1B:
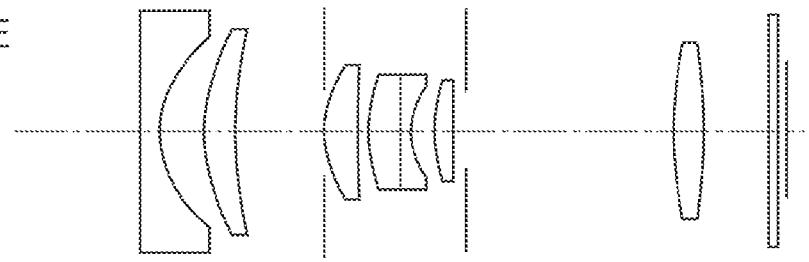
Figure 1C:
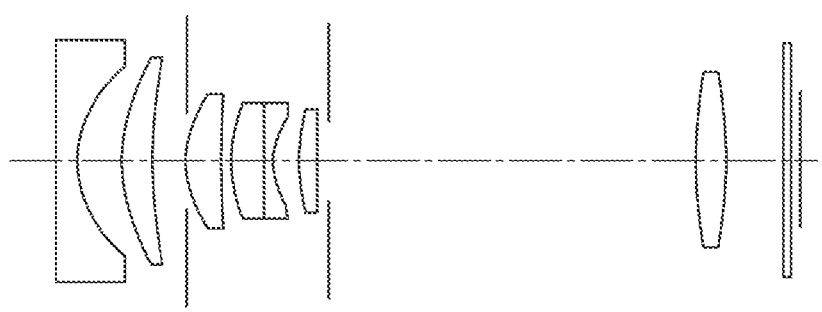
Figure 2A:
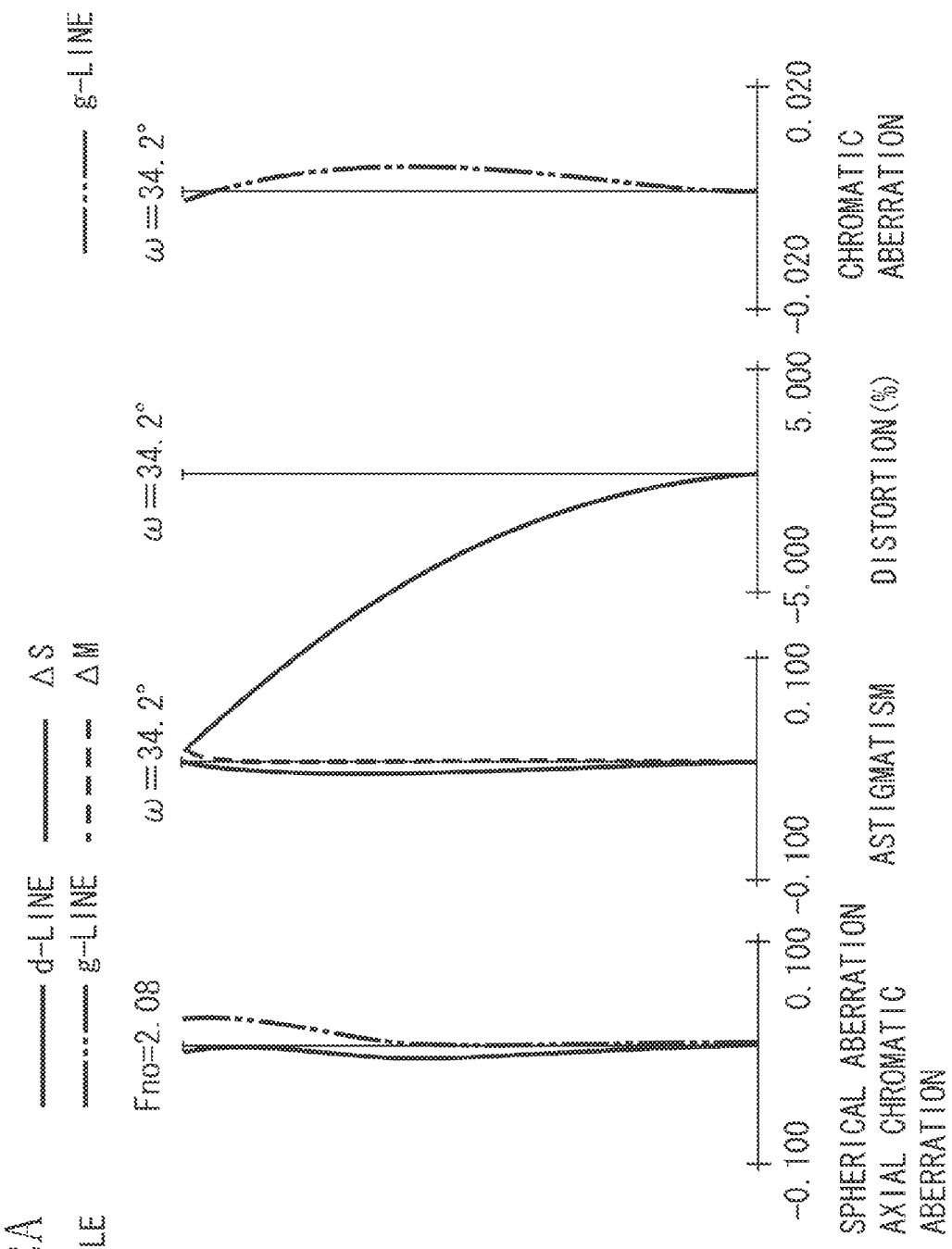

FIGS. 1A, 1B, and 1C are lens cross sections of a zoom lens according to a first exemplary embodiment of the present invention at the wide-angle end (short focal length end), at a middle focal length, and at the telephoto end (long focal length end), respectively. FIGS. 2A through 2C are aberration charts of the zoom lens according to the first exemplary embodiment at the wide-angle end, at the middle focal length, and at the telephoto end, respectively. More specifically, the first exemplary embodiment is a zoom lens having a zoom ratio of 3.64 and an aperture ratio (F-number) ranging from 2.08 to 5.52.

Figure 3A:
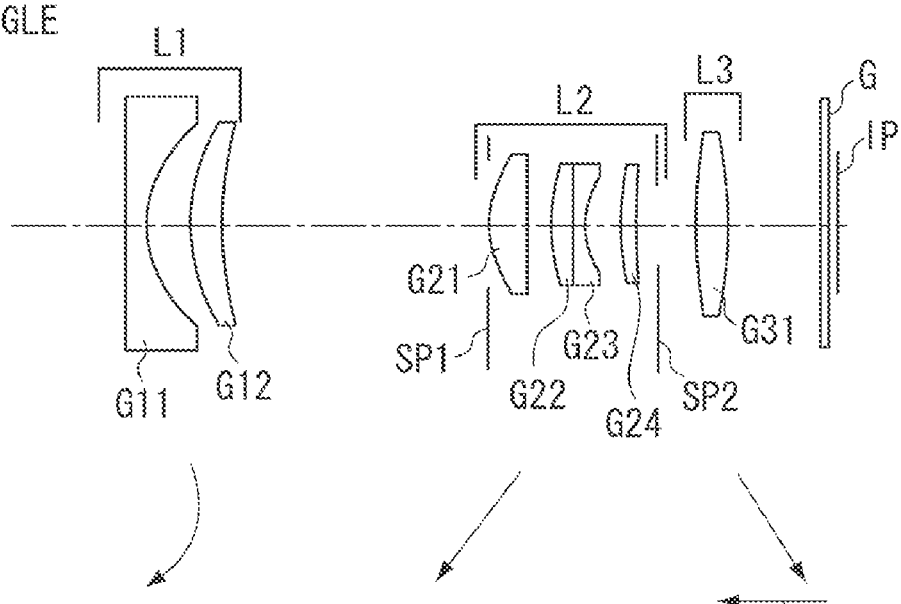
FIGS. 3A, 3B, and 3C are lens cross sections of a zoom lens according to a second exemplary embodiment of the present invention at the wide-angle end, at a middle focal length, and at the telephoto end, respectively.
Figure 3B:
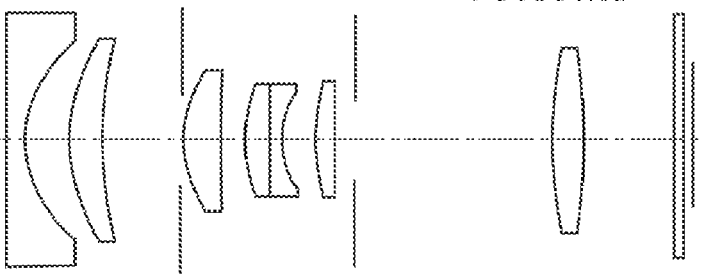
Figure 3C:
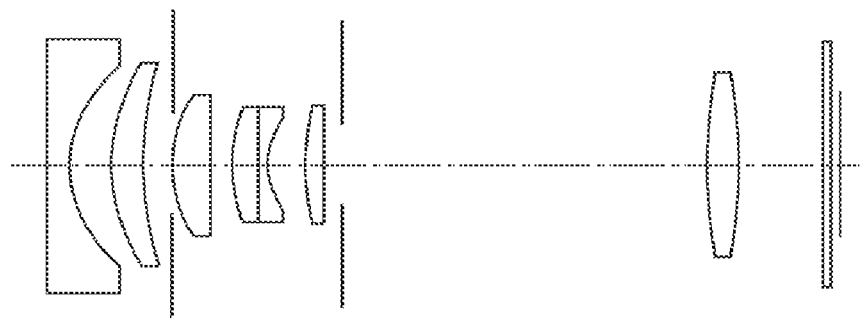

FIGS. 3A, 3B, and 3C are lens cross sections of a zoom lens according to a second exemplary embodiment of the present invention at the wide-angle end, at a middle focal length, and at the telephoto end, respectively. FIGS. 4A, 4B, and 4C are aberration charts of the zoom lens according to the second exemplary embodiment at the wide-angle end, at the middle focal length, and at the telephoto end, respectively. The second exemplary embodiment is a zoom lens having a zoom ratio of 3.51 and an aperture ratio ranging from 2.06 to 5.08.

Figure 5A:
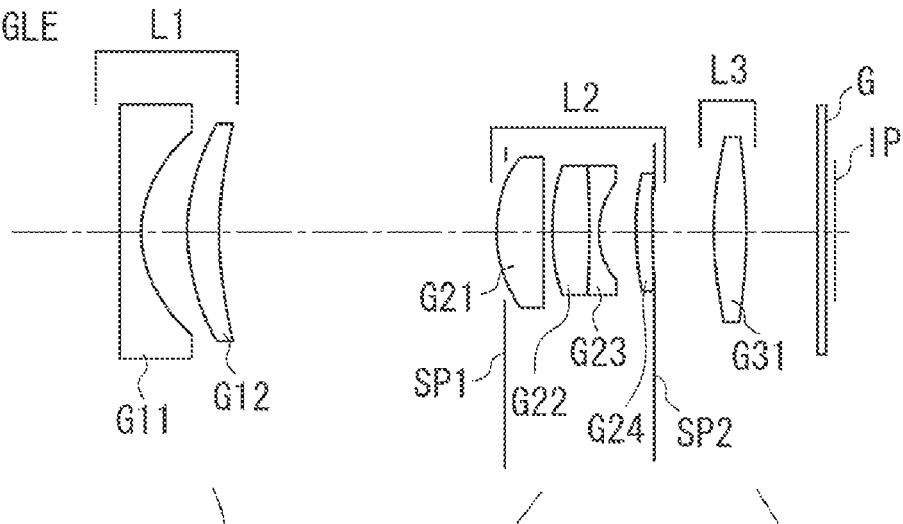
FIGS. 5A, 5B, and 5C are lens cross sections of a zoom lens according to a third exemplary embodiment of the present invention at the wide-angle end, at a middle focal length, and at the telephoto end, respectively.
Figure 5B:
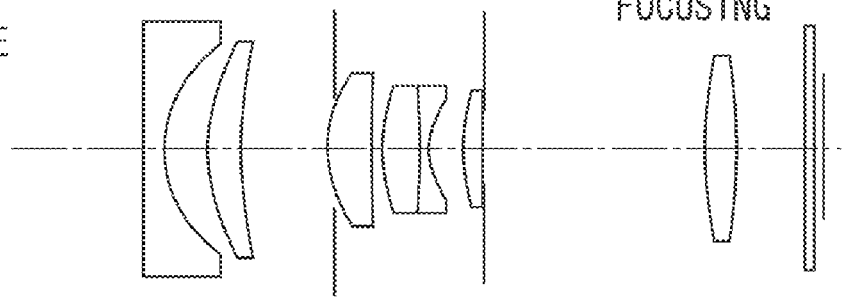
Figure 5C:
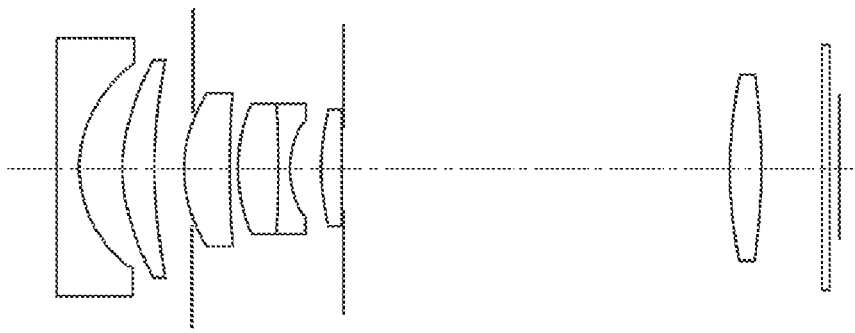
Figure 6C:
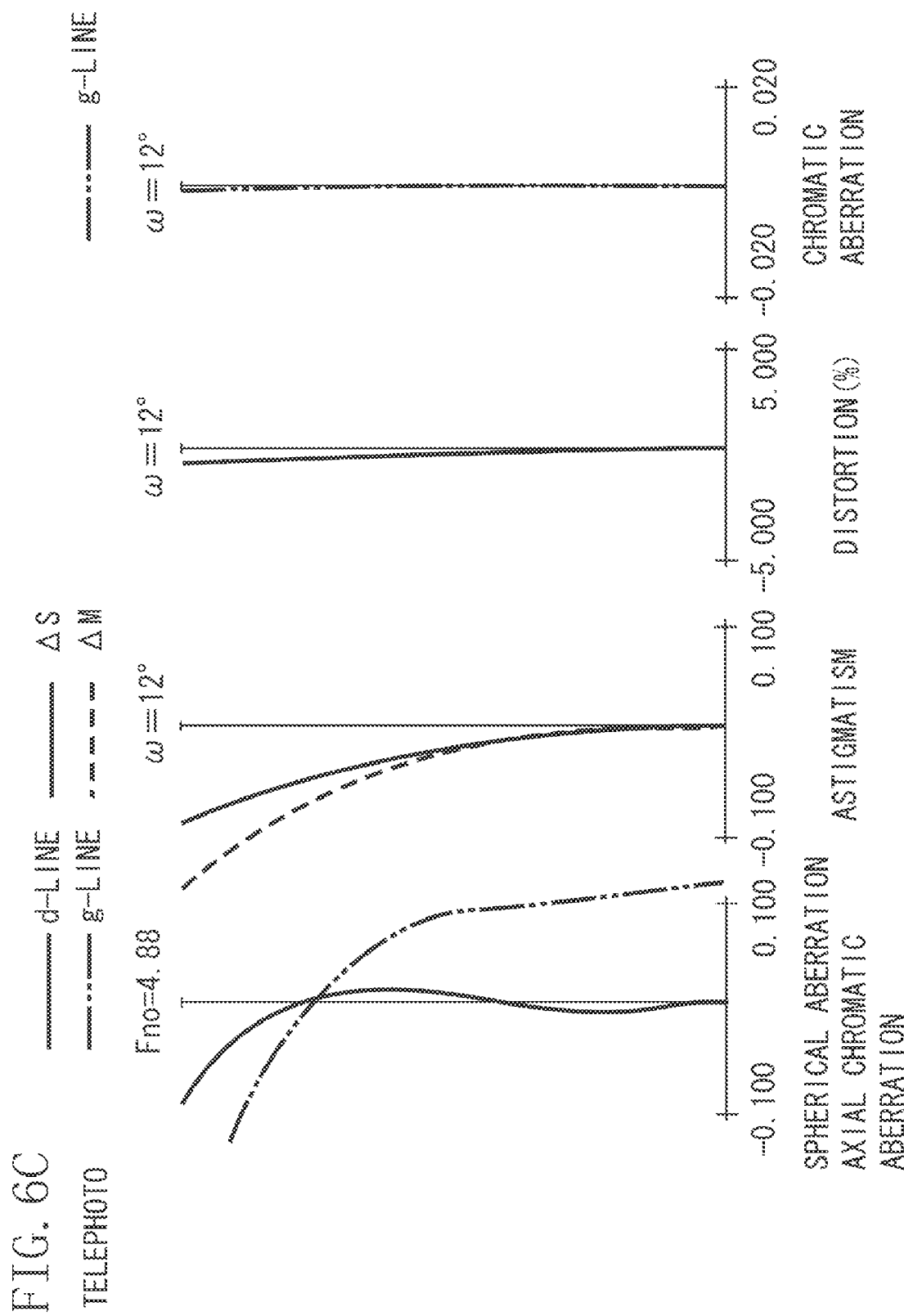
Figure 7:
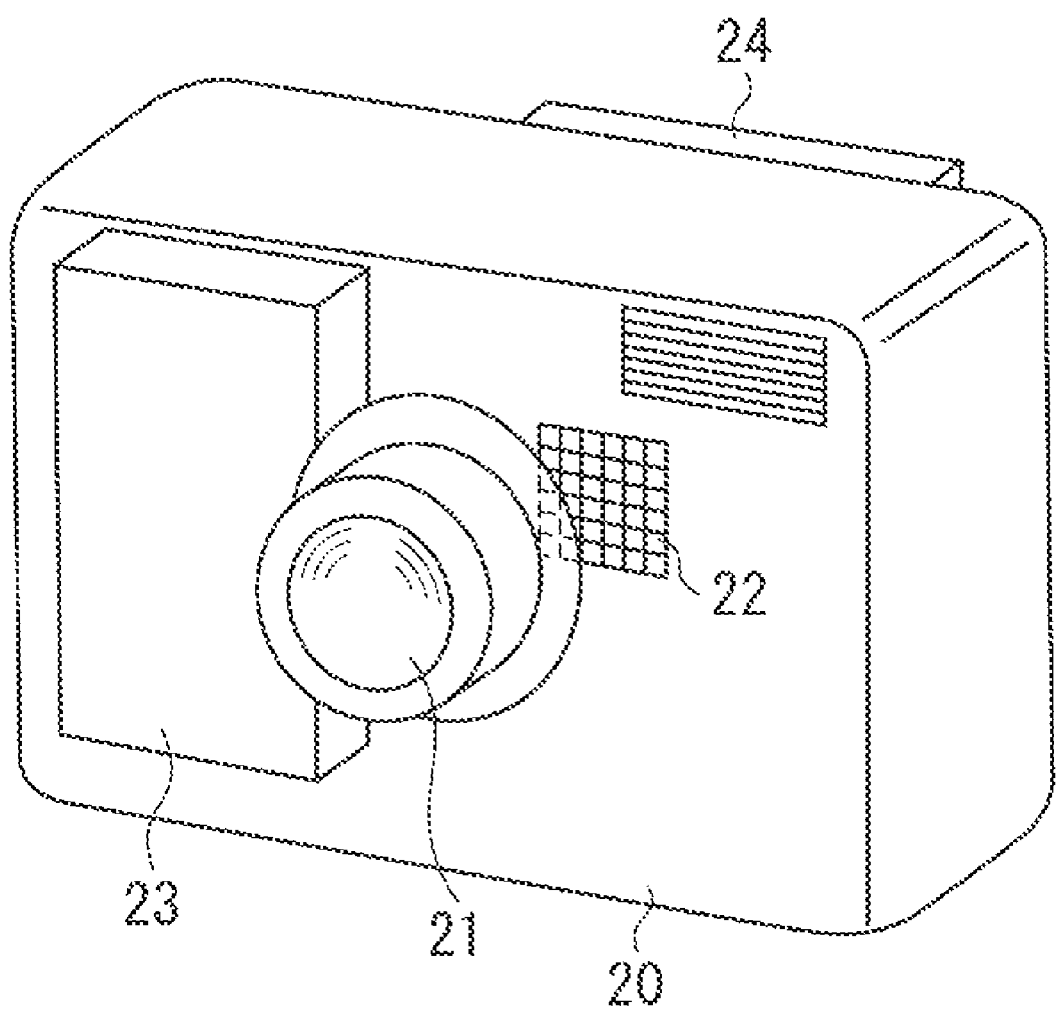
FIG. 7 illustrates main components of an optical apparatus according to an exemplary embodiment of the present invention.

FIGS. 5A, 5B, and 5C are lens cross sections of a zoom lens according to a third exemplary embodiment of the present invention at the wide-angle end, at a middle focal length, and at the telephoto end, respectively. FIGS. 6A, 6B, and 6C are aberration charts of the zoom lens according to the third exemplary embodiment at the wide-angle end, at the middle focal length, and at the telephoto end, respectively. The third exemplary embodiment is a zoom lens having a zoom ratio of 3.63 and an aperture ratio ranging from 1.90 to 4.88. FIG. 7 illustrates components of a digital still camera (image pickup apparatus) including the zoom lens according to an exemplary embodiment of the present invention.

The zoom lens according to each exemplary embodiment is a photographic lens system used for an image pickup apparatus. In each of the diagrams showing a cross section of the zoom lens (FIGS. 1A through 1C, 3A through 3C, and 5A through 5C), an object side (front side) is shown at the left-hand portion of the drawing, and an image side (rear side) is shown at the right-hand portion thereof. If the zoom lens according to each exemplary embodiment of the present invention is used as a projection lens for a projector, in each of the diagrams showing a cross section of the zoom lens (FIGS. 1A through 1C, 3A through 3C, and 5A through 5C), the side of a screen is shown at the left-hand portion of the drawing, and the side of an image to be projected is shown at the right-hand portion thereof.

Furthermore, in each of the diagrams showing a cross section of the zoom lens (FIGS. 1A through 1C, 3A through 3C, and 5A through 5C), the zoom lens includes, in order from the object side to the image side and arranged along the optical axis (dash-dotted line), a first lens unit L1 having a having a negative refractive power (optical power=an inverse of the focal length), a second lens unit L2 having a positive refractive power, and a third lens unit L3 having a positive refractive power.

"SP1" denotes an F-number defining member (hereinafter simply referred to as an "aperture stop"), which can function as an aperture stop configured to define (restrict) a light flux of a full-aperture F-number (Fno). "SP2" denotes a flare cut stop. "G" denotes an optical block, such as an optical filter, a faceplate, a crystal low-pass filter, or an infrared-ray cut filter.

"IP" denotes an image plane. The image plane IP is, when the zoom lens according to an exemplary embodiment of the present invention is used as a photographic optical system of a video camera or a digital still camera, equivalent to an imaging plane of a solid-state image sensor (photoelectric conversion element) such as a charge-coupled device (CCD) sensor or a complementary metal-oxide semiconductor (CMOS) sensor.

In a portion of each aberration chart (FIGS. 2A through 2C, 4A through 4C, and 6A through 6C) showing spherical aberration and axial chromatic aberration, "d" and "g" respectively denote d-line and g-line light. "Fno" denotes an F-number. In a portion of each aberration chart (FIGS. 2A through 2C, 4A through 4C, and 6A through 6C) showing astigmatism, "ΔM" and "ΔS" respectively denote a meridional image plane and a sagittal image plane. Chromatic aberration of magnification is represented with respect to g-line light. "ω" denotes a half angle of view.

In each of the following exemplary embodiments, each of the wide-angle end and the telephoto end refers to a zooming position when a lens unit for variable magnification (the second lens unit L2) is positioned at each of the ends of a range in which the magnification varying lens unit can mechanically move along the optical axis. In each of the diagrams showing a cross section of the zoom lens (FIGS. 1A through 1C, 3A through 3C, and 5A through 5C), an arrow indicates a moving locus along which each lens unit moves during zooming from the wide-angle end to the telephoto end or the direction of moving of each lens unit during focusing from an infinitely-distant object to a short-distance object.

In each exemplary embodiment of the present invention, variation of the image plane, which may occur during variable magnification, is compensated by moving the first lens unit L1 back and forth along a part of a locus convex towards the image side during zooming from the wide-angle end to the telephoto end. Furthermore, during zooming from the wide-angle end to the telephoto end, the second lens unit L2 moves monotonously towards the object side to execute primary variable magnification and the third lens unit L3 moves towards the image side.

More specifically, when each lens unit moves during zooming from the wide-angle end to the telephoto end, the distance between the first lens unit L1 and the second lens unit L2 becomes smaller while the distance between the second lens unit L2 and the third lens unit L3 becomes greater. Focusing from an infinitely-distant object to a short-distance object is executed by moving the third lens unit L3 towards the object side.

The F-number defining member (the aperture stop) SP1 is located on the object side of the second lens unit L2. Alternatively, the aperture stop SP1 can be located between an object side-vertex of a lens G21, which is included in the second lens unit L2 and located closest to the object side, and an intersection of a surface on the object side of the lens G21 and a periphery of the lens G21. The flare cut stop SP2 is located on the image side of the second lens unit L2. During zooming, both the aperture stop SP1 and the flare cut stop SP2 move integrally with the second lens unit L2.

Now, a characteristic of a lens configuration of the zoom lens according to each exemplary embodiment will be described in detail below. In general, if a negative lead type zoom lens, in which a lens unit having a negative refractive power is disposed ahead of the other lens units, is selected in configuring a zoom lens whose size of the entire optical system is small and having a wide angle of view, a long back focus can be easily achieved because a rear principal point position can be located on the image side. In order to implement a zoom lens having a high telecentricity on the image side, it is useful if a lens unit located closest to the image sensor (image plane) is assigned with a positive refractive power and functions as a field lens.

The zoom lens according to each exemplary embodiment includes three lens units including, in order from the object side to the image side, the first lens unit L1 having a negative refractive power, the second lens unit L2 having a positive refractive power, and the third lens unit L3 having a positive refractive power. Another lens unit can be located at least at one of a location on the object side of the first lens unit L1 or a location on the image side of the third lens unit L3. Each lens unit moves during zooming.

In order to implement a zoom lens whose size of the entire optical system is small, having a wide angle of view and a high zoom ratio, and having a high optical performance for the entire zoom area, each exemplary embodiment employs the following three configurations. More specifically, in the three-unit zoom lens according to each exemplary embodiment, let "fw" be the focal length of the entire optical system at the wide-angle end, "f1" be the focal length of the first lens unit L1, and "β2w" and "β3w" be a shooting magnification of the second lens unit L2 and the third lens unit L3 at the wide-angle end, respectively. Then, a focal length of the entire optical system at the wide-angle end (fw) can be calculated by the following expression:

$$fw = f1 \times \beta 2w \times \beta 3w.$$

It can be understood from the above-described expression that to appropriately set the focal length of the first lens unit L1 (f1) is significant in achieving a short focal length at the wide-angle end (fw) and a wide angle of view of the entire optical system.

In general, if the photographic angle of view of a zoom lens is increased, the effective diameter of the front lens may become large. The effective diameter of the front lens is determined according to the height of incidence of an off-axis ray incident on the first lens unit L1. Accordingly, if the refractive power of the first lens unit L1 is appropriately set, a zoom lens having a wide angle of view and small in its entire system-size can be implemented by sufficiently refracting the off-axis ray.

Based on the above-described premise, each exemplary embodiment of the present invention appropriately sets the refractive power of the first lens unit L1 as a condition for a first configuration of the three configurations of the zoom lens according to each exemplary embodiment. Accordingly, each exemplary embodiment can easily reduce the size of the entire optical system while achieving a wide angle of view by sufficiently refracting the off-axis ray.

If the aperture ratio of a zoom lens is simply increased, the pupil diameter may become large in general. Accordingly, in this case, a large amount of spherical aberration and coma may occur. Therefore, in this case, it becomes difficult to correct spherical aberration and coma.

In order to prevent spherical aberration and coma that may otherwise occur in too large an amount, each exemplary embodiment appropriately sets the refractive power of a last lens G24 of the second lens unit L2, which is a lens unit provided around the aperture stop, as a condition for the second of the three configurations each exemplary embodiment employs. Accordingly, each exemplary embodiment implements easy and effective correction of spherical aberration and coma.

If the aperture ratio of a zoom lens is simply increased, a large amount of various aberrations may occur. In order to prevent this, it may seem useful to increase the number of lenses included in each lens unit to correct various aberrations occurring in each lens unit, such as spherical aberration and coma. However, if the number of lenses is simply increased, the lens total length (i.e., the distance from the first lens surface to the image plane) may increase. Therefore, in this case, it becomes difficult to reduce the total size of the optical system.

In order to prevent the above-described problem, each exemplary embodiment appropriately sets the location, at the wide-angle end, of the third lens unit L3 having a positive refractive power on the optical axis as a condition for the third one of the three configurations each embodiment employs. With this configuration, each exemplary embodiment can effectively correct various aberrations without increasing the number of lenses included in each lens unit.

More specifically, if the third lens unit is a focusing lens unit as it is in the present invention, it is necessary that focusing lens unit movable areas, in which the focusing lens unit can move towards the object side and the image side, are provided around the design location of the focusing lens unit in order to correct defocus that may occur due to manufacture errors in the curvature or the thickness of the lens. As a result, in implementing a small-size zoom lens as the present invention, the location of the third lens unit at the telephoto end is dependently determined to the location of the movable area on the object side, which is equivalent to the amount of defocus from the design value thereof. In other words, to determine an amount of movement of the third lens unit L3 during zooming is equivalent to determining the location of the third lens unit L3 on the optical axis at the wide-angle end.

Each exemplary embodiment of the present invention can effectively correct various aberrations without increasing the number of lenses included in the zoom lens by appropriately setting the location of the third lens unit L3 on the optical axis at the wide-angle end. By satisfying the conditions for the three configurations at the same time, each exemplary embodiment can implement a zoom lens whose size of the entire optical system is small, having a wide angle of view and a high zoom ratio, and having a high aperture ratio.

More specifically, in each embodiment, the first lens unit L1 consists of two lenses. Furthermore, the second lens unit L2 consists of, in order from the object side to the image side, a positive lens, a positive lens, a negative lens, and a positive lens. The third lens unit L3 consists of one lens.

A focal length of the entire optical system at the wide-angle end (fw), the focal length of the first lens unit L1 (f1), the focal length of the second lens unit L2 (f2), a focal length of the positive lens included in the second lens unit L2 and located closest to the image side (fG24), and amounts of movement (m2, m3) corresponding to the second lens unit L2 and the third lens unit L3, respectively, moving in the direction of the optical axis during zooming from the wide-angle end to the telephoto end (the sign of the amount of movement is positive during moving towards the image side) are properly set to satisfy the following conditions:

$$1.3 < |f1/fw| < 2.3 \tag{1}$$

$$1.0 < fG24/f2 < 1.6 \tag{2}$$

$$-0.15 < m3/m2 < -0.01 \tag{3}$$

The condition (1) provides a condition for the ratio of the refractive power (the focal length) of the first lens unit L1 to the refractive power of the entire optical system. If the upper limit of the condition (1) is exceeded, then the negative focal length of the first lens unit L1 becomes long. In other words, in this case, the refractive power of the first lens unit L1 becomes very low. Accordingly, it becomes difficult to reduce the effective diameter of the front lens.

On the other hand, if the lower limit of the condition (1) is exceeded, then the negative focal length of the first lens unit L1 becomes short. In other words, in this case, the refractive power of the first lens unit L1 becomes very high. Accordingly, in this case, the Petzval sum may increase in the direction of the negative sign. Therefore, the curvature of field may increase at the wide-angle end.

The condition (2) provides a condition for the refractive power of the lens G24, which is included in the second lens unit L2 and located closest to the image side. If the upper limit of the condition (2) is exceeded, then the focal length of the lens G24 may become excessively long. In other words, in this case, the refractive power of the lens G24 may become very low. Accordingly, the amount of power of the lens G24 achieved in correcting spherical aberration and coma shared with the other lenses may become undesirably low. As a result, it becomes difficult to achieve a desired high optical performance.

On the other hand, if the lower limit of the condition (2) is exceeded, then the focal length of the lens G24 may become very short. In other words, the refractive power of the lens G24 may become very high. As a result, the lens total length may become long because it is necessary to increase the number of constituent lenses and to disperse the refractive powers in order to achieve a high optical performance for the entire zoom range.

The condition (3) provides a condition for the ratio of the amount of movement of the third lens unit L3 to that of the second lens unit L2 executed during zooming. If the upper limit of the condition (3) is exceeded, then the amount of movement of the third lens unit L3 (m3) executed during zooming may become very small. In this case, it becomes difficult to provide the third lens unit L3 around the flare cut stop SP2 at the wide-angle end. As a result, it becomes necessary to increase the number of constituent lenses to achieve a desired high optical performance.

On the other hand, if the lower limit of the condition (3) is exceeded, then the amount of movement of the third lens unit L3 during zooming may become very long. In this case, the distance between the third lens unit L3 and the second lens unit L2 may become very small. As a result, the amount of movement of the third lens unit L3 for focusing may become very small. Accordingly, in this case, it becomes difficult to reduce the object distance available for shooting.

It is further useful if the ranges of the values in the conditions (1) through (3) are altered as follows:

$$1.8 < |f1/fw| < 2.3 \tag{1a}$$

$$1.2 < fG24/f2 < 1.6 \tag{2a}$$

$$-0.10 < m3/m2 < -0.01 \tag{3a}$$

As described above, each exemplary embodiment optimally sets the refractive power assigned to the first lens unit L1, the refractive power assigned to the lens G24 of the second lens unit L2, and the amounts of movement of the second lens unit L2 and the third lens unit L3 during zooming. Accordingly, each exemplary embodiment can achieve the zoom lens having a wide angle of view, a high zoom ratio, and a wide aperture ratio, whose size of the entire optical system is small, and having a high optical performance for the entire zoom range.

It is yet further useful if the zoom lens according to each exemplary embodiment satisfies at least one of the following conditions. A radius of curvature of a surface of the lens G21 on the object side, which is included in the second lens unit L2 and located closest to the object side (G21Ra), a radius of curvature of a surface of the lens G21 on the image side (G21Rb), a lateral magnification of the third lens unit L3 at the wide-angle end (β3w), the focal length of the third lens unit L3 (f3), and a refractive index of a material of the positive lens G24, which is included in the second lens unit L2 and located closest to the image side (NG24), can be appropriately set to satisfy at least one of the following conditions:

$$-1.5 < (G21Ra+G21Rb)/(G21Ra-G21Rb) \leq -1.0 \quad (4)$$

$$0.35 < (1-\beta 3w^2) < 0.50 \quad (5)$$

$$0.8 < f2/f1 < 1.3 \quad (6)$$

$$3.5 < f3/fw < 6.0 \quad (7)$$

$$NG24 > 1.75 \quad (8).$$

The technical significance of each of the conditions (4) through (8) will be described in detail below. The condition (4) provides a condition for the shape of the lens G21, which is included in the second lens unit L2 and located closest to the object side. If the condition (4) has a value "−1.0", then the lens G21 has a convex-flat shape, with which the surface of the lens G21 is convex towards the object side. On the other hand, if the upper limit of the condition (4) is exceeded up to "−0.3", for example, then both surfaces of the lens G21 have a convex shape.

In this case, it is necessary to increase the thickness of the lens on the optical axis in order to prevent the lens from becoming too thin at its periphery. As a result, the total thickness of the second lens unit L2 on the optical axis is increased. Accordingly, the lens total length may increase.

On the other hand, if the lower limit of the condition (4) is exceeded to a value as low as "−0.2", for example, then the lens G21 has a meniscus shape, in which the surface of the lens G21 on the object side has a convex shape and the curvature is more intense on the object side than on the image side. In this case, the dispersion of the surface of the lens G21 on the image side may become very high. Accordingly, spherical aberration cannot be effectively corrected.

The condition (5) provides a condition for the positional sensitivity of the third lens unit L3 at the wide-angle end. In general, a positional sensitivity ES of a lens unit A can be calculated by the following expression:

$$ES = (1-\beta a^2) \beta b^2$$

where "βa" denotes a lateral magnification of the lens unit A and "βb" denotes a lateral magnification of a lens unit B, which is provided on the image side of the lens unit A.

As will be described in a numerical example corresponding to each exemplary embodiment, if no lens unit is located subsequently to the third lens unit L3, the lateral magnification βb has a value "1". In this case, a positional sensitivity ES3 of the third lens unit L3 can be calculated by the following expression:

$$ES3 = 1 - \beta 3w^2.$$

If the upper limit of the condition (5) is exceeded, then the positional sensitivity ES3 of the third lens unit L3 may become very high. In this case, the image plane may greatly fluctuate due to a very small movement of the third lens unit L3. Accordingly, in this case, it may become necessary to stop the third lens unit L3 during focusing at a very high accuracy.

If the lower limit of the condition (5) is exceeded, then the positional sensitivity ES3 of the third lens unit L3 may become very low. In other words, the amount of movement of the third lens unit L3 during focusing for shooting a desired short-distance object may become very large. As a result, it becomes necessary, at the stage of designing the zoom lens, to secure a sufficient distance between the second lens unit L2 and the third lens unit L3 in order and to prevent mechanical interference between the second lens unit L2 and the third lens unit L3 that may otherwise occur during focusing. In this case, the lens total length may increase.

The condition (6) provides a condition for the ratio of the focal length of the second lens unit L2 (f2) to the focal length of the first lens unit L1 (f1) (i.e., the ratio of the refractive power of the second lens unit L2 to the refractive power of the first lens unit L1). If the upper limit of the condition (6) is exceeded, then the focal length of the second lens unit L2 becomes very long. In other words, in this case, the refractive power of the second lens unit L2 may become very small. Accordingly, in order to achieve a desired high zoom ratio, it becomes necessary to increase the amount of movement of the second lens unit L2 during zooming. As a result, the lens total length at the telephoto end (i.e., the distance between the first lens surface and the image plane) may become very long.

On the other hand, if the lower limit of the condition (6) is exceeded, then the focal length of the second lens unit L2 becomes very short. In other words, in this case, the refractive power of the second lens unit L2 may become very high. As a result, it may become difficult to correct spherical aberration and coma in the entire zoom area.

The condition (7) provides a condition for the refractive power of the third lens unit L3 (i.e., an inverse of the focal length f3 of the third lens unit L3). If the upper limit of the condition (7) is exceeded, then the refractive power of the third lens unit L3 may become very small. As a result, the telecentricity may become very low. On the other hand, if the lower limit of the condition (7) is exceeded, then the refractive power of the third lens unit L3 may become very high. As a result, the image plane may very greatly vary during focusing.

The condition (8) provides a condition for the refractive index of a material of the lens G24, which is included in the second lens unit L2 and located closest to the image side. If the lower limit of the condition (8) is exceeded, then the refractive index of the material of the lens G24 becomes very low. In this case, it becomes necessary to intensify the radius of curvature of the lens surface to achieve a desired refractive power. As a result, the Petzval sum may become very great in the positive direction. Accordingly, curvature of field may increase in this case.

In each exemplary embodiment, the range of the values in the conditions (4) through (8) can be altered as follows:

$$-1.2 < (G21Ra+G21Rb)/(G21Ra-G21Rb) \leq -1.0 \quad (4a)$$

$$0.38 < (1-\beta 3w^2) < 0.45 \quad (5a)$$

$$0.9 < |f2/f1| < 1.2 \quad (6a)$$

$$4.0 < f3/fw < 5.5 \quad (7a)$$

$$NG24 > 1.8 \quad (8a).$$

A lens configuration of each lens unit of the zoom lens according to each exemplary embodiment will be described in detail below. In each exemplary embodiment, the first lens unit L1 having a negative refractive power consists of two lenses including, in order from the object side to the image side, a negative lens G11, whose surface on the image side has a concave shape, and a positive lens G12, which has a meniscus shape and whose surface on the object side has a convex shape.

In the first lens unit L1, a large amount of off-axis ray is refracted at the wide-angle end. Accordingly, in the first lens unit L1, a large amount of various off-axis aberrations, particularly astigmatism and distortion, are likely to occur. Each exemplary embodiment includes the negative lens G11 and the positive lens G12 and prevents an increase of the effective diameter of the negative lens G11, which is located closer to the object side than the positive lens G12.

In each exemplary embodiment, the first lens unit L1 consists of two lenses, each of which is made of a glass material having a high refractive index. With this configuration, each exemplary embodiment reduces the curvature of each lens surface to suppress curvature of field.

In addition, each exemplary embodiment uses a glass material having low dispersion as a material of the negative lens G11 and a glass material having high dispersion as a material of the positive lens G12. With the above-described configuration, each exemplary embodiment can effectively correct axial chromatic aberration at the telephoto end and chromatic aberration of magnification at the wide-angle end.

In addition, in each exemplary embodiment, both lens surfaces of the negative lens G11 on the object side and on the image side, whose surface on the image side having a concave shape, have an aspheric shape. More specifically, in the negative lens G11 having the above-described configuration, the negative refractive power becomes lower from the center of the lens towards the periphery thereof. With this configuration, each exemplary embodiment can correct astigmatism and distortion in a highly balanced manner. In addition, in each exemplary embodiment in which the number of lenses included in the first lens unit L1 is as small as two, the size of the entire optical system (zoom lens) can be effectively reduced.

In each exemplary embodiment, the second lens unit L2 having a positive refractive power consists of, in order from the object side to the image side, a positive lens, a positive lens, a negative lens, and a positive lens. More specifically, the second lens unit L2 consists of four lenses including a positive lens G21 whose surface on the object side has a convex shape, a cemented lens including a positive lens G22 whose surface on the object side has a convex shape and a negative lens G23 whose surface on the image side has a concave shape, which are cemented to each other, and a positive lens G24 whose surface on the object side has a convex shape.

The positive lens G21 is located closest to the object side within the second lens unit L2. In the positive lens G21, the height of incidence of an axial ray is the highest of the lenses included in the second lens unit L2. The configuration of the positive lens G21 is closely related to the amount of spherical aberration and coma.

In each exemplary embodiment, the surface of the positive lens G21 on the object side has an aspheric shape. More specifically, in the positive lens G21 having the above-described configuration, the positive refractive power becomes lower from the center of the lens towards the periphery thereof. With this configuration, each exemplary embodiment can correct spherical aberration and coma.

The axial ray is incident on the second lens unit L2 in the entire zoom area. Accordingly, the second lens unit L2 includes the cemented lens including the positive lens G22 and the negative lens G23 cemented to each other to correct axial chromatic aberration.

In each exemplary embodiment, the cemented lens includes, in order from the object side to the image side, the positive lens and the negative lens. Furthermore, in each exemplary embodiment, the effective diameter of the lens included in the second lens unit L2 is as small as possible. Moreover, the negative lens G23 is located at a position at which the height of the incident light becomes lowest. With this configuration, each exemplary embodiment can easily correct aberrations. In addition, in each exemplary embodiment, the positive lens G24 is located in the second lens unit L2 at a position closest to the image side to lower the angle of exit of an off-axis ray exiting from the second lens unit L2.

The third lens unit L3 functions as a field lens for securing a sufficiently high telecentricity on the image side. The third lens unit L3 consists of one positive lens G31 to reduce the total thickness of the lens on the optical axis. More specifically, the third lens unit L3, which is a focusing lens unit, moves from the image side towards the object side during focusing from an infinitely-distant object to a short-distance object. Each exemplary embodiment sets an appropriate positional sensitivity to execute focusing. Accordingly, each exemplary embodiment can easily execute focusing at a high speed.

With the above-described configuration, each exemplary embodiment can achieve a zoom lens whose size of the entire optical system is small and having a high optical performance for the entire zoom area.

Numerical examples 1 through 3, which respectively correspond to the first through the third exemplary embodiments of the present invention, are set forth below. In each of the numerical examples 1 through 3, "i" (where i=1, 2, 3 . . . ) denotes the order of a surface from the object side, "ri" denotes a radius of curvature of an i-th optical surface (the i-th lens surface), "di" denotes an axial space between the i-th surface and the (i+1)-th surface (i.e., the lens thickness or distance from the i-th surface to the (i+1)-th surface), "ndi" and "vdi" respectively denote a refractive index and an Abbe number of the material of the i-th optical member with respect to d-line light. An asterisk "*" denotes an aspheric surface. Each of two surfaces located closest and next closest to the image side is made of a glass material, such as a faceplate.

In addition, each of "k", "A4", "A6", "A8", and "A10" denotes an aspheric coefficient for each corresponding order. The aspheric shape is expressed as $$x=(h^2/R))/[1+\{1-(1+k)(h/R)^2\}^{1/2}]+A4 \cdot h^4+A6 \cdot h^6+A8 \cdot h^8+A10 \cdot h^{10}$$

where "x" denotes a displacement from a surface vertex along the optical axis in a position at a height "h" from the optical axis, and "R" denotes a paraxial radius of curvature. The back focus BF is expressed by a distance from a surface No. 17 made of a glass material and located closest to the image side.

In numerical examples 1 and 3, the value of the air space d5 has a negative sign. This is because the aperture stop SP1 and the lens G21 of the second lens unit L2 located closest to the object side are provided in this order from the object side to the image side. The relationship between each condition described above and each numerical example is set forth in Table 1.

NUMERICAL EXAMPLE 1

| Unit: mm | | | | |
|---|---|---|---|---|
| Surface Data | | | | |
| Surface No. | r | d | nd | vd |
| 1* | 10581.732 | 1.05 | 1.84954 | 40.1 |
| 2* | 5.636 | 2.44 | | |
| 3 | 10.419 | 1.70 | 1.92286 | 18.9 |

-continued

Unit: mm

| | | | | |
|---|---|---|---|---|
| 4 | 21.722 | Variable | | |
| 5 (Stop) | ∞ | −0.10 | | |
| 6* | 6.186 | 1.99 | 1.69350 | 53.2 |
| 7* | 119.843 | 0.50 | | |
| 8 | 8.293 | 1.74 | 1.69680 | 55.5 |
| 9 | 213.475 | 0.53 | 1.80518 | 25.4 |
| 10 | 4.117 | 1.42 | | |
| 11 | 11.000 | 0.96 | 1.80610 | 40.9 |
| 12 | 60.520 | 0.76 | | |
| 13 | ∞ | Variable | | |
| 14 | 22.530 | 1.75 | 1.60311 | 60.6 |
| 15 | −27.828 | Variable | | |
| 16 | ∞ | 0.50 | 1.51633 | 64.1 |
| 17 | ∞ | 0.40 | | |
| Image plane | ∞ | | | |

Aspheric Coefficients

| | | | |
|---|---|---|---|
| r1 | K = −7.54512e+008 | A4 = −1.38805e−004 | A6 = 7.17177e−006 |
| | A8 = −1.21730e−007 | A10 = 6.89682e−010 | |
| r2 | K = −1.98273e+000 | A4 = 7.51437e−004 | A6 = −3.27004e−006 |
| | A8 = 3.37011e−007 | A10 = −7.59294e−009 | |
| r6 | K = −1.10011e−001 | A4 = −1.84607e−004 | A6 = 4.36626e−006 |
| | A8 = 1.83467e−007 | A10 = 6.15066e−008 | |
| r7 | K = −3.16200e+003 | A4 = 4.01015e−004 | A6 = −9.29540e−006 |
| | A8 = 2.35305e−006 | A10 = −1.99365e−009 | |

Various Data
Zoom Ratio 3.64

| | | | |
|---|---|---|---|
| Focal Length | 5.00 | 11.44 | 18.18 |
| F-number | 2.08 | 4.68 | 5.52 |
| Angle of View | 34.22 | 18.72 | 12.03 |
| Image Height | 3.40 | 3.88 | 3.88 |
| Lens Total Length | 37.75 | 35.65 | 40.82 |
| BF | 0.40 | 0.40 | 0.40 |
| d4 | 15.18 | 4.95 | 2.00 |
| d13 | 3.17 | 11.65 | 20.14 |
| d15 | 3.76 | 3.40 | 3.04 |

Various Data of Each Unit

| Lens unit | First surface | Focal length |
|---|---|---|
| 1 | 1 | −11.28 |
| 2 | 5 | 10.85 |
| 3 | 14 | 20.92 |

NUMERICAL EXAMPLE 2

Unit: mm

Surface Data

| Surface No. | r | d | nd | vd |
|---|---|---|---|---|
| 1* | −20191.198 | 1.05 | 1.84954 | 40.1 |
| 2* | 5.574 | 2.30 | | |
| 3 | 9.598 | 1.70 | 1.94595 | 18.0 |
| 4 | 17.098 | Variable | | |
| 5 (Stop) | ∞ | 0.00 | | |
| 6* | 6.465 | 1.99 | 1.69350 | 53.2 |
| 7* | 440.238 | 1.24 | | |
| 8 | 9.781 | 1.30 | 1.72000 | 50.2 |
| 9 | −38.611 | 0.50 | 1.80518 | 25.4 |

-continued

Unit: mm

| | | | | |
|---|---|---|---|---|
| 10 | 4.650 | 1.88 | | |
| 11 | 12.946 | 1.00 | 1.88300 | 40.8 |
| 12 | −328.929 | 0.98 | | |
| 13 | ∞ | Variable | | |
| 14 | 31.589 | 1.75 | 1.60311 | 60.6 |
| 15 | −30.816 | Variable | | |
| 16 | ∞ | 0.50 | 1.51633 | 64.1 |
| 17 | ∞ | 0.40 | | |
| Image plane | ∞ | | | |

Aspheric Coefficients

| | | | |
|---|---|---|---|
| r1 | K = −7.54512e+008 | A4 = −1.39421e−004 | A6 = 1.00616e−005 |
| | A8 = −2.14939e−007 | A10 = 1.67641e−009 | |
| r2 | K = −1.56434e+000 | A4 = 5.45153e−004 | A6 = 8.34852e−006 |
| | A8 = 5.03540e−008 | A10 = −3.80863e−009 | |
| r7 | K = −6.70203e−001 | A4 = 5.89980e−005 | A6 = 1.16420e−006 |
| | A8 = 1.01607e−006 | A10 = 2.06367e−008 | |
| r8 | K = −1.09940e+003 | A4 = 1.45594e−004 | A6 = 2.89787e−006 |
| | A8 = 1.81915e−006 | A10 = −1.52041e−008 | |

Various Data
Zoom Ratio 3.51

| | | | |
|---|---|---|---|
| Focal Length | 4.97 | 11.13 | 17.48 |
| F-number | 2.06 | 4.40 | 5.08 |
| Angle of View | 34.36 | 19.19 | 12.50 |
| Image Height | 3.40 | 3.88 | 3.88 |
| Lens Total Length | 37.16 | 35.64 | 40.98 |
| BF | 0.40 | 0.40 | 0.40 |
| d4 | 13.96 | 4.26 | 1.41 |
| d13 | 1.95 | 10.44 | 18.92 |
| d15 | 4.66 | 4.36 | 4.06 |

Various Data of Each Unit

| Lens unit | First surface | Focal length |
|---|---|---|
| 1 | 1 | −10.53 |
| 2 | 5 | 10.85 |
| 3 | 14 | 26.14 |

NUMERICAL EXAMPLE 3

Unit: mm

Surface Data

| Surface No. | r | d | nd | vd |
|---|---|---|---|---|
| 1* | 21479.539 | 1.05 | 1.84954 | 40.1 |
| 2* | 5.646 | 2.31 | | |
| 3 | 10.392 | 1.70 | 1.92286 | 18.9 |
| 4 | 22.062 | Variable | | |
| 5 (Stop) | ∞ | −0.49 | | |
| 6* | 6.612 | 2.38 | 1.69350 | 53.2 |
| 7* | 96.954 | 0.44 | | |
| 8 | 8.208 | 2.11 | 1.69680 | 55.5 |
| 9 | −67.396 | 0.51 | 1.80518 | 25.4 |
| 10 | 4.258 | 1.73 | | |
| 11 | 11.142 | 1.00 | 1.88300 | 40.8 |
| 12 | 69.540 | 0.12 | | |
| 13 | ∞ | Variable | | |
| 14 | 18.799 | 1.75 | 1.60311 | 60.6 |
| 15 | −39.663 | Variable | | |
| 16 | ∞ | 0.50 | 1.51633 | 64.1 |

-continued

Unit: mm

| | | | |
|---|---|---|---|
| 17 | ∞ | 0.40 | |
| Image plane | ∞ | | |

Aspheric Coefficients

| | | | |
|---|---|---|---|
| r1 | K = −7.54512e+008 | A4 = −1.28466e−004 | A6 = 6.58435e−006 |
| | A8 = −1.06612e−007 | A10 = 5.28051e−010 | |
| r2 | K = −1.87367e+000 | A4 = 6.73617e−004 | A6 = −2.37351e−006 |
| | A8 = 3.30733e−007 | A10 = −7.90220e−009 | |
| r7 | K = −9.99009e−002 | A4 = −1.70329e−004 | A6 = 4.85020e−006 |
| | A8 = −2.11883e−007 | A10 = 3.32651e−008 | |
| r8 | K = −2.57961e+003 | A4 = 4.71206e−004 | A6 = −2.02095e−005 |
| | A8 = 2.01371e−006 | A10 = −1.99354e−008 | |

Various Data
Zoom Ratio 3.63

| | | | |
|---|---|---|---|
| Focal Length | 5.00 | 11.43 | 18.17 |
| F-number | 1.90 | 3.50 | 4.88 |
| Angle of View | 34.22 | 18.72 | 12.04 |
| Image Height | 3.40 | 3.88 | 3.88 |
| Lens Total Length | 37.65 | 35.54 | 40.71 |
| BF | 0.40 | 0.40 | 0.40 |
| d4 | 15.17 | 4.94 | 1.99 |
| d13 | 3.16 | 11.65 | 20.13 |
| d15 | 3.80 | 3.44 | 3.08 |

Various Data of Each Unit

| Lens unit | First surface | Focal length |
|---|---|---|
| 1 | 1 | −11.33 |
| 2 | 5 | 10.85 |
| 3 | 14 | 21.39 |

TABLE 1

| | Numerical Example | | |
|---|---|---|---|
| Condition | 1 | 2 | 3 |
| (1) | 2.26 | 2.15 | 2.27 |
| (2) | 1.52 | 1.30 | 1.37 |
| (3) | −0.04 | −0.04 | −0.04 |
| (4) | −1.11 | −1.03 | −1.15 |
| (5) | 0.43 | 0.40 | 0.43 |
| (6) | 0.96 | 1.03 | 0.96 |
| (7) | 4.18 | 5.34 | 4.28 |
| (8) | 1.81 | 1.88 | 1.88 |

An exemplary embodiment of a digital still camera (image pickup apparatus (optical apparatus)) that uses the zoom lens according to each exemplary embodiment of the present invention as a photographic optical system thereof will be described below with reference to FIG. 7.

Referring to FIG. 7, the digital still camera includes a camera body 20 and a photographic optical system 21. The photographic optical system 21 includes an optical system according to any of the first through the third exemplary embodiments described above.

The camera body 20 includes a solid-state image sensor (photoelectric conversion element) 22, such as a CCD sensor or a CMOS sensor, configured to optically receive an object image formed by the photographic optical system 21.

The camera body 20 also includes a memory 23, which records information corresponding to an object image that has been photoelectrically converted by the solid-state image sensor 22. In addition, the camera body 20 also includes a viewfinder 24, which includes a liquid crystal display (LCD) panel and via which a user of the camera can observe an object image formed on the solid-state image sensor 22.

By applying the zoom lens according to each exemplary embodiment of the present invention to an image pickup apparatus, such as a digital still camera, the present invention can implement a small-size image pickup apparatus having a high optical performance.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-007579 filed Jan. 16, 2010, which is hereby incorporated by reference herein in its entirety.

What is claimed is:

1. A zoom lens comprising, in order from an object side to an image side and arranged along an optical axis thereof:
   a first lens unit having a negative refractive power;
   a second lens unit having a positive refractive power; and
   a third lens unit having a positive refractive power,
   wherein each lens unit moves during zooming from a wide-angle end to a telephoto end,
   wherein the first lens unit consists of two lenses,
   wherein the second lens unit consists of, in order from the object side to the image side:
      a positive lens;
      a positive lens;
      a negative lens; and
      a positive lens,
   wherein the third lens unit consists of one lens, and
   wherein a focal length of the entire zoom lens at the wide-angle end (fw), a focal length of the first lens unit (f1), a focal length of the second lens unit (f2), a focal length of the positive lens included in the second lens unit and located closest to the image side (fG24), and an amount of movement (m2) of the second lens unit and an amount of movement (m3) of the third lens unit in a direction of the optical axis during zooming from the wide-angle end to the telephoto end satisfy the following conditions:

$$1.3 < |f1/fw| < 2.3,$$

$$1.0 < fG24/f2 < 1.6 \text{ and}$$

$$-0.15 < m3/m2 < -0.01.$$

2. The zoom lens according to claim 1, wherein a radius of curvature of a surface on the object side (G21Ra) and a radius of curvature of a surface on the image side (G21Rb) of the positive lens that is included in the second lens unit and located closest to the object side satisfy the following condition:

$$-1.5 < (G21Ra + G21Rb)/(G21Ra - G21Rb) \leq -1.0.$$

3. The zoom lens according to claim 1, wherein a lateral magnification of the third lens unit at the wide-angle end ($\beta 3w$) satisfies the following condition:

$$0.35 < (1 - \beta w^2) < 0.50.$$

4. The zoom lens according to claim 1, wherein the focal length of the first lens unit (f1) and the focal length of the second lens unit (f2) satisfy the following condition:

$$0.8 < f2/f1 < 1.3.$$

5. The zoom lens according to claim 1, wherein the focal length of the third lens unit (f3) and the focal length of the entire zoom lens at the wide-angle end (fw) satisfy the following condition:

$3.5 < f3/fw < 6.0.$

6. The zoom lens according to claim 1, wherein a refractive index of a material of the positive lens that is included in the second lens unit and located closest to the image side (NG24) satisfies the following condition:

$NG24 > 1.75.$

7. The zoom lens according to claim 1, wherein, during zooming from the wide-angle end to the telephoto end, the first lens unit is configured to move towards the image side along a locus convex towards the image side, the second lens unit is configured to monotonously move towards the object side, and the third lens unit is configured to move towards the image side.

8. The zoom lens according to claim 1, wherein one of the two lenses included in the first lens unit is a negative lens, and the lens surfaces on the object side and the image side of the negative lens included in the first lens unit have an aspheric shape.

9. The zoom lens according to claim 1, wherein the third lens unit is configured to move towards the object side during focusing from an infinitely-distant object to a short-distance object.

10. An optical apparatus comprising the zoom lens according to claim 1.

* * * * *